United States Patent
Haugstetter

(10) Patent No.: US 10,488,117 B1
(45) Date of Patent: Nov. 26, 2019

(54) AIRCRAFT HEAT EXCHANGER DEFROST SYSTEM

(71) Applicant: Hamilton Sundstrand Corporation, Charlotte, NC (US)

(72) Inventor: Christoph Haugstetter, West Hartford, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 15/891,435

(22) Filed: Feb. 8, 2018

(51) Int. Cl.
- B60H 1/00 (2006.01)
- F28D 1/04 (2006.01)
- B64D 41/00 (2006.01)

(52) U.S. Cl.
CPC ......... *F28D 1/0417* (2013.01); *B64D 41/007* (2013.01)

(58) Field of Classification Search
CPC .... B60H 2001/003; B60H 2001/00164; B64D 15/02; B64D 15/22; B64D 15/00; B64D 15/06; B64D 15/20; B64D 41/007; F28D 1/0417; F28D 9/0093; F28D 7/0066; F28D 7/0075; F28D 7/0083; F28F 2210/04
See application file for complete search history.

(56) References Cited

U.S. PATENT DOCUMENTS

| | | | | |
|---|---|---|---|---|
| 4,334,409 A | * | 6/1982 | Daugas | F01K 23/065 60/618 |
| 5,048,597 A | * | 9/1991 | Bond | B64G 1/401 165/141 |
| 5,214,935 A | | 6/1993 | Brunskill | |
| 5,553,461 A | | 9/1996 | Hitzigrath et al. | |
| 5,609,029 A | * | 3/1997 | Ahnger | F01K 23/065 60/618 |
| 9,745,069 B2 | | 8/2017 | Shea | |
| 9,939,202 B2 | * | 4/2018 | Geskes | F28D 7/0025 |
| 2011/0061388 A1 | * | 3/2011 | Lehar | F01K 23/10 60/653 |
| 2011/0174000 A1 | * | 7/2011 | Richter | B60H 1/00064 62/93 |
| 2014/0202663 A1 | * | 7/2014 | Shea | B64D 15/06 165/104.19 |

FOREIGN PATENT DOCUMENTS

FR        828108 A        5/1938

OTHER PUBLICATIONS

Extended European Search Report for European Application No. 18210710.2; dated Jun. 12, 2019; dated Jun. 27, 2019; 6 Pages.

\* cited by examiner

*Primary Examiner* — Tho V Duong
(74) *Attorney, Agent, or Firm* — Cantor Colburn LLP

(57) ABSTRACT

Heat exchange systems for aircraft are provided. The heat exchange systems include an inlet manifold and an outlet manifold with a direction of flow being upstream at the inlet manifold and downstream at the outlet manifold, a first heat exchanger core arranged between the inlet manifold and the outlet manifold and located adjacent the inlet manifold, a second heat exchanger core arranged downstream of the first heat exchanger core, a third heat exchanger core arranged downstream of the second heat exchanger core and located adjacent the outlet manifold, wherein the third heat exchanger core is fluidly connected to the first heat exchanger core, and a control system operably connected to the first heat exchanger core and the third heat exchanger core, wherein the control system is arranged to direct a fluid between the first and third heat exchanger cores.

16 Claims, 2 Drawing Sheets

AIRCRAFT HEAT EXCHANGER DEFROST SYSTEM

STATEMENT OF FEDERAL SUPPORT

This invention was made with Government support under contract number FA8650-16-D-2617 awarded by the Air Force Research Lab. The Government has certain rights in the invention.

BACKGROUND

Environmental control systems for aerospace applications have relied on subfreezing heat exchangers for decades. Pressurized air, typically obtained from an engine bleed, is expanded through a turbine which thus extracts work and reduces an outlet temperature low enough to be used as a heat sink for different cooling loads in the system. While lower temperatures are generally desirable, freezing of moisture in the air must be addressed, as frost may buildup on sub-freezing surfaces and impede system operations by clogging airflow and increase resistance of heat transfer.

Subfreezing heat exchangers are known in the art. However as improvements in turbine engine has occurred, the turbine outlet temperature has gone as low as −45 to −65° C. As higher power density systems become relevant, the outlet temperature will continue to be lowered, thus creating additional challenges regarding ice accumulation/frost within the systems. The basic principle of subfreezing heat exchangers is a highly efficient hot side (as hot as possible) and a somewhat inefficient heat transfer on the cold side. Such heat exchangers results in metal temperatures above freezing and thereby prevents ice from building up. Accordingly, it may be advantageous to have systems arranged to reduce or eliminate frost build-up while maintaining desired heat transfer efficiencies.

BRIEF DESCRIPTION

According to some embodiments, heat exchange systems for aircraft are provided. The heat exchange systems include an inlet manifold and an outlet manifold with a direction of flow being upstream at the inlet manifold and downstream at the outlet manifold, a first heat exchanger core arranged between the inlet manifold and the outlet manifold and located adjacent the inlet manifold, a second heat exchanger core arranged downstream of the first heat exchanger core, a third heat exchanger core arranged downstream of the second heat exchanger core and located adjacent the outlet manifold, wherein the third heat exchanger core is fluidly connected to the first heat exchanger core, and a control system operably connected to the first heat exchanger core and the third heat exchanger core, wherein the control system is arranged to direct a fluid between the first and third heat exchanger cores.

In addition to one or more of the features described herein, or as an alternative, further embodiments of the heat exchange systems may include that the control system comprises a controller, a valve, a first core supply line, a bypass supply line, and a third core supply line, wherein the first core supply line fluidly connects to the first heat exchanger core and the third core supply line fluidly connects to the third heat exchanger core, and wherein the controller is arranged to control operation of the valve.

In addition to one or more of the features described herein, or as an alternative, further embodiments of the heat exchange systems may include a means for detecting a temperature within the heat exchange system, wherein the controller controls operation of the valve based on input from the means for detecting a temperature.

In addition to one or more of the features described herein, or as an alternative, further embodiments of the heat exchange systems may include that the controller is arranged to control a fluid flow through the first core supply line, the bypass supply line, and the third core supply line to supply a fluid into the first heat exchanger core and the third heat exchanger core.

In addition to one or more of the features described herein, or as an alternative, further embodiments of the heat exchange systems may include that the first heat exchanger core comprises a first passage and a second passage, wherein the first passage is upstream of the second passage.

In addition to one or more of the features described herein, or as an alternative, further embodiments of the heat exchange systems may include that the second heat exchanger core comprises a first passage and a second passage, wherein the first passage is downstream of the second passage.

In addition to one or more of the features described herein, or as an alternative, further embodiments of the heat exchange systems may include that the third heat exchanger core comprises a first passage located adjacent the outlet manifold and a second passage located upstream from the first passage.

In addition to one or more of the features described herein, or as an alternative, further embodiments of the heat exchange systems may include a first fluid within the first and third heat exchanger cores and a second fluid within the second heat exchanger core.

In addition to one or more of the features described herein, or as an alternative, further embodiments of the heat exchange systems may include that the first fluid is polyalphaolefin (PAO) and the second fluid is aircraft fuel.

In addition to one or more of the features described herein, or as an alternative, further embodiments of the heat exchange systems may include a cooling fluid flow from the inlet manifold to the outlet manifold, wherein the cooling fluid extracts heat from the first fluid and the second fluid.

According to some embodiments, aircraft are disclosed herein. The aircraft include a heat exchange system having an inlet manifold and an outlet manifold with a direction of flow being upstream at the inlet manifold and downstream at the outlet manifold, a first heat exchanger core arranged between the inlet manifold and the outlet manifold and located adjacent the inlet manifold, a second heat exchanger core arranged downstream of the first heat exchanger core, a third heat exchanger core arranged downstream of the second heat exchanger core and located adjacent the outlet manifold, wherein the third heat exchanger core is fluidly connected to the first heat exchanger core, and a control system operably connected to the first heat exchanger core and the third heat exchanger core, wherein the control system is arranged to direct a fluid between the first and third heat exchanger cores.

In addition to one or more of the features described herein, or as an alternative, further embodiments of the aircraft may include that the control system comprises a controller, a valve, a first core supply line, a bypass supply line, and a third core supply line, wherein the first core supply line fluidly connects to the first heat exchanger core and the third core supply line fluidly connects to the third heat exchanger core, and wherein the controller is in communication with the sensor and arranged to control operation of the valve.

In addition to one or more of the features described herein, or as an alternative, further embodiments of the aircraft may include a means for detecting a temperature within the heat exchange system, wherein the controller controls operation of the valve based on input from the means for detecting a temperature.

In addition to one or more of the features described herein, or as an alternative, further embodiments of the aircraft may include that the controller is arranged to control a fluid flow through the first core supply line, the bypass supply line, and the third core supply line to supply a fluid into the first heat exchanger core and the third heat exchanger core.

In addition to one or more of the features described herein, or as an alternative, further embodiments of the aircraft may include that the first heat exchanger core comprises a first passage and a second passage, wherein the first passage is upstream of the second passage.

In addition to one or more of the features described herein, or as an alternative, further embodiments of the aircraft may include that the second heat exchanger core comprises a first passage and a second passage, wherein the first passage is downstream of the second passage.

In addition to one or more of the features described herein, or as an alternative, further embodiments of the aircraft may include that the third heat exchanger core comprises a first passage located adjacent the outlet manifold and a second passage located upstream from the first passage.

In addition to one or more of the features described herein, or as an alternative, further embodiments of the aircraft may include a first fluid within the first and third heat exchanger cores and a second fluid within the second heat exchanger core.

In addition to one or more of the features described herein, or as an alternative, further embodiments of the aircraft may include that the first fluid is polyalphaolefin (PAO) and the second fluid is aircraft fuel.

In addition to one or more of the features described herein, or as an alternative, further embodiments of the aircraft may include a cooling fluid flow from the inlet manifold to the outlet manifold, wherein the cooling fluid extracts heat from the first fluid and the second fluid, wherein the cooling fluid is extracted from a turbine of the aircraft.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1A:
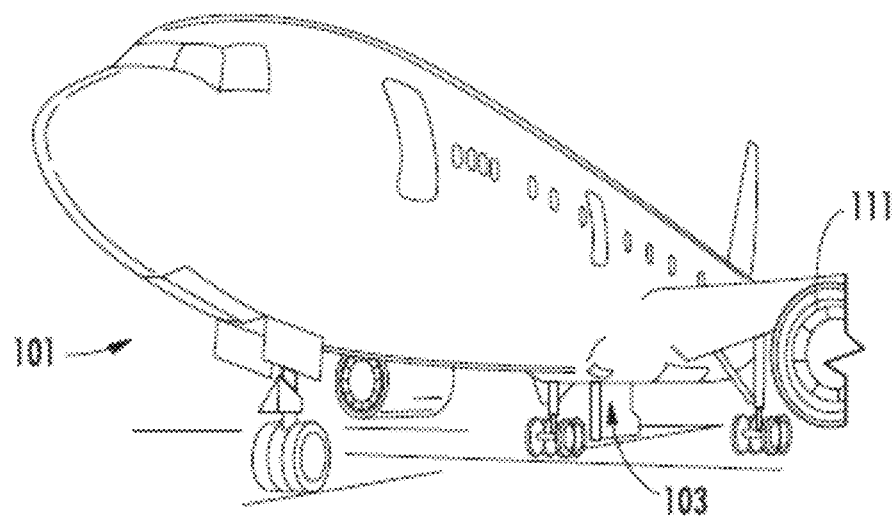
FIG. 1A is a schematic illustration of an aircraft that can incorporate various embodiments of the present disclosure.
Figure 1B:
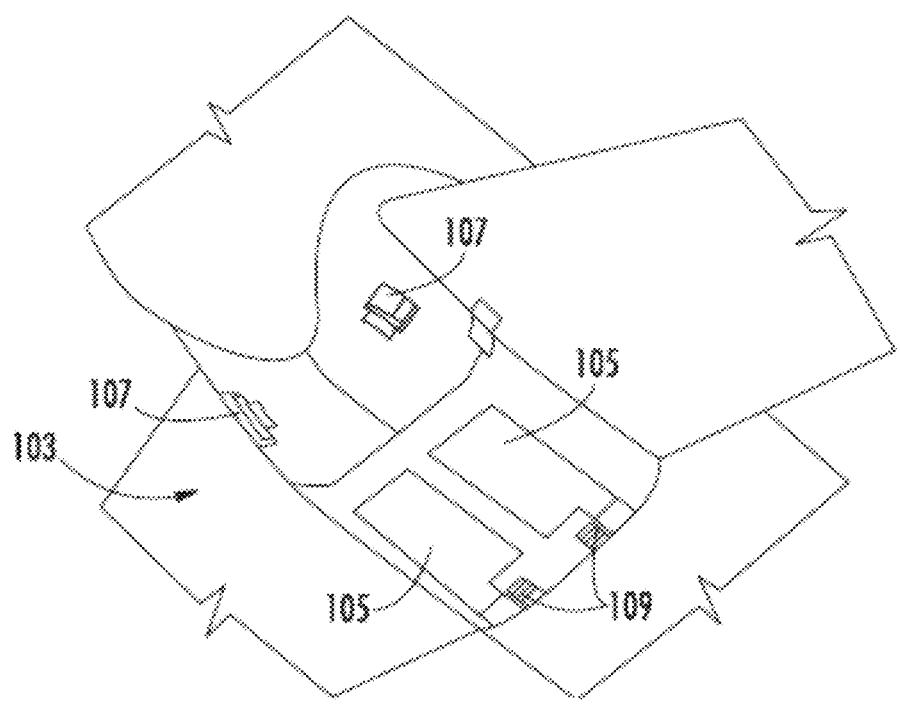
FIG. 1B is a schematic illustration of a bay section of the aircraft of FIG. 1A.

As shown in FIGS. 1A-1B, an aircraft 101 can include one or more bays 103 beneath a center wing box. The bay 103 can contain and/or support one or more components of the aircraft 101. For example, in some configurations, the aircraft 101 can include heat exchangers, environmental control systems, water separation units, and/or fuel inerting systems within the bay 103. As shown in FIG. 1B, the bay 103 includes bay doors 105 that enable installation and access to one or more components (e.g., environmental control systems, fuel inerting systems, heat exchanger, etc.). During operation of environmental control systems, heat exchangers, and/or fuel inerting systems of the aircraft 101, air that is external to the aircraft 101 can flow into the various components within the bay doors 105 through one or more ram air inlets 107. The air may then flow through the components to be used for heat exchange, processing, and/or supplied to various other components or locations within the aircraft 101 (e.g., passenger cabin, cockpit, aircraft internal space, fuel inerting systems, etc.). Some air may be exhaust through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to various aircraft components, including, but not limited to environmental control systems heat exchangers, and/or fuel inerting systems, as will be appreciated by those of skill in the art.

It is to be understood that, while the embodiments described herein relate to the aircraft 100, other embodiments exist in which the aircraft 100 can be replaced by another type of a vehicle. This vehicle may be primarily ground-based or flight-ready. Thus, it is to be further understood that the descriptions relating to the aircraft 100 are not so limited and are provided only for purposes of illustration and explanation, and do not limit the scope of the disclosure as a whole.

In aircraft operations, the basic principle is to keep all metal temperatures of a heat exchanger above the freezing point (0° C.), which is achieved through a specific design of heat exchangers. Such designs can include optimized heat transfer coefficient (determined by fin type and sizing) to be ensured to be high on the hot side of the heat exchanger, but purposefully lower on the cold side. Such heat transfer coefficient differential can shift metal temperatures closer to the hot side. This can be detrimental due to larger cold side channels, which can enlarge the total heat exchanger volume.

As noted above and appreciated by those of skill in the art, as air exits a turbine (used in such cooling systems), when air moisture is present, the air will contain water in the form of 'snow' that the first (hot) pass of the heat exchanger is tasked to melt which requires providing the sensible and latent heat to the air stream to do so. The sizing of said melt pass is determined by worst case flows, temperatures, and moisture content of the air. In order to keep the melt-pass to a minimal size, the warmest possible fluid is selected for performing the melt-operation in the first (hot) pass of the heat exchanger.

Heat exchanger efficiency is highest with counter-flow arrangements, followed cross-flow, and subsequently co-flow. Multi-pass (on the hot side) cross-flow versions approximate counter-flow (with a simpler design than true counter-flow). While from a freezing perspective, co-flow would be desirable (lowest cold inlet temperature coincides with highest hot inlet temperature), such arrangements may result in overall poor heat exchanger performance.

In view of the above, a hybrid cooling flow scheme is provided herein. In accordance with some embodiments, the warmest hot inlet flow is used for melt-pass and subsequently re-directed or ducted to the outlet side of the airside, from where it flows through a cross-counter-flow arrangement through the rest of the heat exchanger. Thus, embodiments of the present disclosure can result in a last hot pass interfacing with a relatively low cold side (right after the melt-pass), thereby minimizing the achievable outlet temperature of the hot fluid.

In operation, multiple different hot side liquids require cooling. A first liquid (e.g., fuel) can be used for cold storage within the system, and thus is gradually cooled ("pulled down") to just a few degrees above freezing, i.e., 0° C. A second liquid (e.g., aircraft oil, polyalphaolefin (PAO), etc.) can be used to cool miscellaneous loads within the aircraft, and such second liquid may enter the heat exchanger at about 35° C. and may require cooling down to about 15° C. Because the first liquid at the end of the pull-down cycle needs to get to a lower temperature (about 0° C.) than the second liquid (about 15° C.), it is most efficient to use the cold air (e.g., turbine bleed air) to first cool the first liquid and then use the now slightly warmer air to cool the second liquid. The air can then be used to cool yet other loads on the aircraft before eventually been ejected overboard. Such dual-liquid cooling (and different temperatures) can result in two heat exchanger cores back-to-back, through which the cold air flows sequentially.

Further, in operation, during times when the first liquid is still much higher than freezing temperature, hot and cold side passes can be designed to prevent ice accumulation anywhere in both heat exchanger cores (of the back-to-back heat exchanger cores). However, as the temperature eventually drops (e.g., cold storage increases in the system), the prevention of ice accumulation becomes more difficult. One solution to this problem is to increase the total volume of the heat exchangers, which is undesirable in aircraft applications.

In sum, and as appreciated by those of skill in the art, the purpose of using (cold) turbine outlet temperature air is to cool several loads within aircraft systems. In order to maximize the total heat transfer, it may be ideal to cool the load which requires the coldest temperatures first, before using the (now slightly warmer—but still cold) air to cool additional loads. The problem with such operation is that if the hot side of the "coldest cooling load" is insufficiently above the freezing temperature, keeping metal temperatures high enough to prevent ice build-up requires increasingly larger devices. On the other hand, moving the "warmer cooling load" to be cooled first and then cool the "colder cooling load" reduces the overall achievable heat transfer. This is further complicated by the fact that during a typical flight envelope, the cooling loads and the turbine outlet temperatures are far from constant, making it necessary to design for a worst case that may seldom or never happen. As such, embodiments provided herein are directed to separating various heat exchanger cores to achieve the "warmer cooling" load in two sections—one before and one after the "colder cooling load" and further employs a control scheme to determine a split ratio of the warm flow to optimize performance.

Accordingly, embodiments provided herein are directed to heat exchange systems having active control to optimally run a unique arrangement of heat exchanger cores. The heat exchanger of the present disclosure include a series of heat exchanger cores, with alternating fluids therein. For example, in some embodiments, the heat exchangers include a first core having a first fluid therein, a second core downstream from the first core with a second fluid therein, and a third core downstream from the second core and having the first fluid therein.

Figure 2:
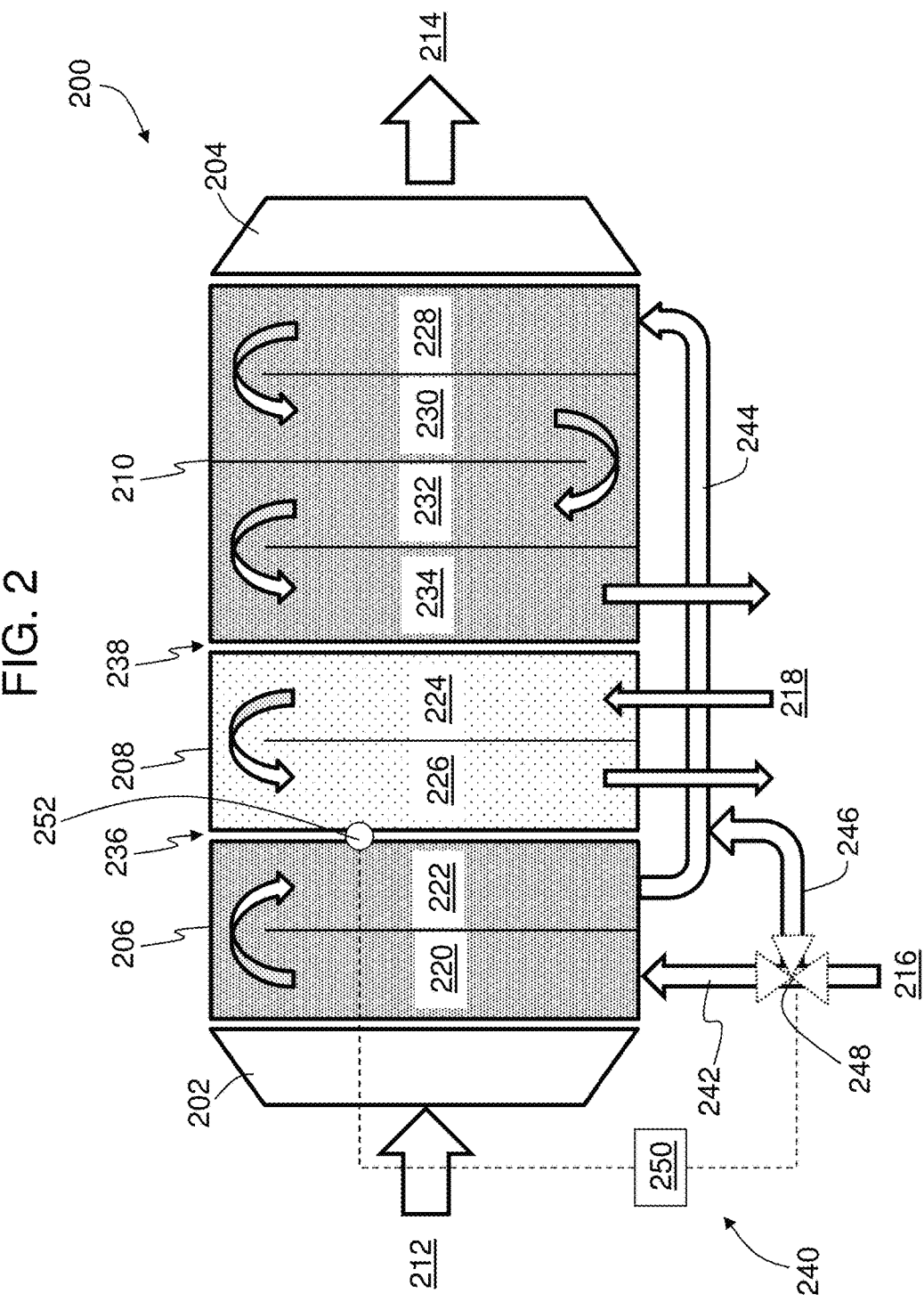
FIG. 2 is a schematic illustration of a heat exchange system in accordance with an embodiment of the present disclosure.

For example, turning to FIG. 2, a schematic illustration of a heat exchange system 200 in accordance with an embodiment of the present disclosure is shown. The heat exchange system 200 may be arranged within an aircraft such as that shown in FIG. 1, and in some embodiments, may be arranged as the heat exchanger 126 as part of the ACM 122.

The heat exchange system 200 is a dual-liquid heat exchange system that employs a single cooling fluid (e.g. a third fluid, such as air) to cool two separate fluids of an aircraft system. Accordingly, the heat exchange system 200 includes an inlet manifold 202 and an outlet manifold 204 with a plurality of heat exchanger cores 206, 208, 210 located therebetween. A cooling fluid 212 is directed into the inlet manifold 202, to pass through the heat exchanger cores 206, 208, 210, and then exit through the outlet manifold 204 as exhaust fluid 214. The cooling fluid 212 heats up as it passes through the heat exchanger cores 206, 208, 210 and thus the exhaust fluid 214 is at a higher temperature than the cooling fluid 212, although it is the same air. In some embodiments, the cooling fluid 212 can be sourced from a turbine of an aircraft and be at sub-freezing temperatures, and in some embodiments may be around −90° C. (or lower), although any sub-freezing temperatures may be employed for embodiments of the present disclosure. As the cooling fluid 212 passes through the heat exchanger cores 206, 208, 210, it operates as a heat sink to remove heat from the fluids passing through the heat exchanger cores 206, 208, 210.

The heat exchange system 200, as noted, is configured to all heat exchange between the cooling fluid 212 and two separate fluids, such as a first fluid 216 and a second fluid 218. In an aircraft arrangement, the first fluid 216 may be polyalphaolefin (PAO) or other aircraft oil and the second fluid 218 may be aircraft fuel. As noted above, the two separate fluids 216, 218 may be required to be cooled to different temperatures. Further, the two separate fluids 216, 218 may enter the heat exchange system 200 at different temperatures, and thus different cooling schemes may be required. Moreover, because the two fluids 216, 218 may have different input temperatures, the one having the higher temperature may be used to prevent ice build-up within the heat exchange system.

In the present embodiment, the first fluid 216 is arranged to pass through the first and third heat exchanger cores 206, 210, and the second fluid 218 is arranged to pass through the second heat exchanger core 208. Each heat exchanger core 206, 208, 210 can have one or more passages, with each passage being a pass of the fluid therein across the flow of cooling fluid 212 as the cooling fluid passes through the heat exchange system 200. In the present embodiment, the first heat exchanger core 206 includes a respective first passage 220 and second passage 222. The second heat exchanger core 208 includes a respective first passage 224 and second passage 226. The third heat exchanger core 210 includes a respective first passage 228, second passage 230, third passage 232, and fourth passage 234. Although shown and described with a specific number of passages, those of skill in the art will appreciate that the heat exchanger cores of the present disclosure can include one or more passages, and the present illustration is not to be limiting in any way. Each of the passages of the heat exchanger cores can be fluidly connected but arranged to direct the fluid therein to optimally discharge heat or thermal energy into the cooling fluid 212 as it passes through the heat exchange system 200. Further, each of the heat exchanger cores of the present embodiments may be fluidly isolated from each other, unless otherwise stated. For example, the first heat exchanger core 206 is separated from the second heat exchanger core 208 by a first wall 236 and the second heat exchanger core 208 is separated from the third heat exchanger core 210 by a second wall 238.

As used here, the ordering or numbering of the passages of a given heat exchanger core represents the flow direction of a fluid through the respective heat exchanger core. That is, for example, a fluid will enter a given heat exchanger core at the first passage, pass through the second passage, and so on. Further, it will be appreciated that the ordering/numbering of the passages of the heat exchanger cores is not made with respect to a flow direction of the cooling fluid 212 through the heat exchange system 200.

For example, reference will be made to an upstream direction being toward the inlet manifold 202 and a downstream direction being toward the outlet manifold 204, and thus upstream and downstream will refer to a direction of flow of the cooling fluid 212 as it passes through the heat exchange system 200. As schematically shown, the first passage 220 of the first heat exchanger core 206 is located adjacent to the inlet manifold 202. As such, the hottest temperature of the first fluid 216 can interact with the cooling fluid 212 at the lowest temperature of the cooling fluid 212. Such interaction (and thermal exchange) can be employed to warm the cooling fluid 212 such that frost formation and/or accumulation is avoided. In one non-limiting example, the cooling fluid 212 may enter the inlet manifold 202 at temperatures as low as about −90° C. and the first fluid 216 may enter the first passage 220 of the first heat exchanger core 206 at about 35° C. The second passage 222 of the first heat exchanger core 206 is located downstream from the first passage 220 and is thus a greater distance or farther away from the inlet manifold 202. Accordingly, the first fluid 216, as it passes through the first heat exchanger core 206 will have a generally downstream direction of flow, with the inlet of the first fluid 216 into the first heat exchanger core 206 being upstream of the outlet of the first fluid 216 from the first heat exchanger core 206.

In contrast, the second fluid 218 may have a generally upstream direction of flow. The reason for this may be to achieve a desired outlet temperature of the second fluid 218. To achieve this, the interaction of the second fluid 218 with the cooling fluid 212 as the cooling fluid 212 passes through the heat exchange system 200 can be designed in a specific manner. For example, as shown, the first passage 224 of the second heat exchanger core 208 is located downstream of the second passage 226 of the second heat exchanger core 208. As such, the lower temperatures of the cooling fluid 212 will interact with the second passage 226 of the second heat exchanger core 208 prior to interacting with the higher temperatures of the second fluid 218 within the first passage 224 of the second heat exchanger core 208. Accordingly, the inlet of the second fluid 218 into the second heat exchanger core 208 is downstream of the outlet of the second fluid 218 from the second heat exchanger core 208.

Referring again to the first fluid 216, as it flows through the third heat exchanger core 210, the flow direction is generally upstream, with the inlet of the first fluid 216 into the third heat exchanger core 210 being downstream from the outlet of the first fluid 216 from the third heat exchanger core 210. Thus, as shown, the first passage 228 of the third heat exchanger core 210 is located adjacent the outlet manifold 204, and the second, third, and fourth passages 230, 232, 234 are located sequentially upstream from the first passage 228 of the third heat exchanger core 210.

The heat exchange system 200 further includes a control system 240 that is arranged to control the flow of the first fluid 216 into and through the first and third heat exchanger cores 206, 210. To control the flow of the first fluid 216, the control system includes a first core supply line 242, as third core supply line 244, and a bypass supply line 246. A valve 248 is arranged to direct flow toward the first core supply line 242 or the bypass supply line 246. In operation, the first fluid 216 can flow through the valve 248, into the first core supply line 242, into the first heat exchanger core 206, exit the first heat exchanger core 206, enter the third core supply line 244, and then flow through and out of the third heat exchanger core 210. However, the valve 248 can be controlled to direct some or all of the first fluid 216 through the bypass supply line 246 such that the portion (or all) of the first fluid 216 will flow directly into the third core supply line 244 and directly into the third heat exchanger core 210.

The control system 240 is arranged to control operation of the valve 248 through a controller 250. The controller 250 can be a mechanical and/or electrical controller that is arranged to control an amount or volume of the first fluid 216 that is passed through the first heat exchanger core 206. In some embodiments, the controller 250 may be part of the controller 128 shown and described above with respect to FIG. 1.

As shown, the controller 250 is operably connected to the valve 248 and is in communication with an optional sensor 252 that is located at, on, or in thermal communication with the first wall 236 of the heat exchange system 200 (i.e., located between the first heat exchanger core 206 and the second heat exchanger core 208). The sensor 252, depending on the configuration of the system, may be arranged to measure air temperatures of the cooling fluid 212 within a flow path of the cooling fluid, or in other embodiments, may be arranged to measure metal temperatures of the first wall 236, or further still, in some embodiments, the sensor 252 may be arranged to measure fluid temperatures of one or both of the first and second fluids 216, 218 proximate the first wall 236. Thus, the location and type of the sensor is not to be limiting, and is shown herein schematically merely for explanatory purposes. In addition to measuring temperatures, the sensor 252 (or a combination of sensors) can be arranged to measure a moisture content of the cooling fluid 212. Further, the sensor, in some embodiments, may be a virtual sensor, as will be appreciated by those of skill in the art. For example, such virtual sensors can operate based on multiple controller internal variable (e.g., turbine speed, temperature, pressure, etc.) and estimate temperature of the system (or parts of the system) without any actual sensor hardware. That is, for example, in some embodiments, rather than incorporate a physical sensor located in or on the system, various other inputs or information may be employed to estimate a temperature using the controller 250. In such embodiments, the controller 250 may be operably in communication with one or more additional aircraft systems to obtain appropriate information therefrom. In operation, using inputs from various aircraft systems, the controller 250 can employ one or more algorithms, as known in the art, to estimate a temperature at a specific location. Such inputs, as noted, can include, without limitation, turbine speed, air temperature, air pressure, temperature measurements of other materials or systems (e.g., fuel and/or polyalphaolefin (PAO)/oil temperature sensors that are employed for other purposes). Thus, a physical sensor is optional, and any known means, method, mechanism, and/or device can be employed by embodiments of the present disclsoure to enable direct measurement, indirect measurement, and/or estimation of temperatures in order to operate the valve 248.

In one non-limiting embodiment, the control system 240 may be arranged to ensure that ice accumulation is minimized or eliminated by ensuring sufficiently hot first fluid 216 flows through the first heat exchanger core 206. For example, referring to the cooling fluid 212, the cooling fluid 212 may enter the inlet manifold 202 at about −90° C. and thermally interact with the first fluid 216 within the first heat exchanger core 206 such that the temperature of the cooling fluid 212 at the location of the first wall 236 is about −20° C. The cooling fluid 212 will continue to flow toward the outlet manifold 204 and will interact with the second fluid within the second heat exchanger core 208 such that the temperature of the cooling fluid 212 at the second wall 238 is about 0° C. The cooling fluid 212 will continue to flow downstream and interact with the first fluid 216 within the third heat exchanger core 210 and exit through the outlet manifold 204 at about 30° C.

In such a system as described above, the first fluid 216 may enter the system (at the valve 248) at about 35° C. A portion of the first fluid 216 passing through the first heat exchanger core 206 may enter the third core supply line at about 30° C. (after interacting with the cold cooling fluid 212). The first fluid 216 can then be directed into the third heat exchanger core 210 at the cooled 30° C. (from the first heat exchanger core 206), at the original 35° C. if passed entirely through the bypass supply line 246, or at some intermediate temperature that comprises a mixture of the original 35° C. first fluid 216 passed through the bypass supply line 246 and the cooled first fluid 216 as it exits the first heat exchanger core 206 at about 30° C. The first fluid 216 may then be further cooled as it flows through the third heat exchanger core 210 such that the first fluid 216 exits the third heat exchanger core 210 at about 15° C. In this example, the second fluid 218 may enter the second heat exchanger core 208 at about 10° C. and exit the second heat exchanger core 208 at about 5° C.

In the above non-limiting example, it will be readily appreciated by those of skill in the art that during actual operation, the temperatures might vary over a large range, as, for example, a turbine exit temperature varies widely (e.g., between −90 and −10° C.). Further, it will be appreciated that air temperatures may be well below freezing inside the cores. However, such sub-freezing temperatures may not be problematic, as long as the local metal temperatures of the heat exchange system stay above 0° C. As such, any ice or snow in contact with the metal would not be able to accumulate, instead such ice/snow would melt and be blown through the heat exchange system (e.g., carried by the flow of the cooling fluid).

Further, in the above example, the cooling of the second fluid (from 10° C. cooled down to 5° C.) represents a worst-case example, end-of-pulldown situation. During initial pull-down, it may be the case that inlet temperatures of the second fluid may be higher than the first fluid, but shutting down the melt-pass may not be practical because metal temperatures may drop to low enough levels to accumulate ice.

Embodiments provided herein allow for the reduction and/or elimination of ice/frost buildup within a heat exchange system. For example, embodiments provided herein enable one or more passes of a hot first fluid such that the first pass(es) of the first fluid operate as a melt-pass, followed (downstream relative to a cooling fluid) by a heat exchanger core for a second fluid, and finally the majority of cooling required for the first fluid is performed downstream of the cooling of the second fluid. While prior (static) designs were arranged to accommodate a worst case combination of flows, temperatures, and moisture, at the cost of being "wasteful" most of the time, embodiments provided herein (e.g., the control system) allows the system to adapt to changing conditions in an optimal way.

For example, in operation, if no air moisture is present (at high altitudes), the melt-pass can be completely shut-off. In such embodiments, the valve 248 is controlled to direct all of the first fluid 216 into the bypass supply line 246 and directly through the third core supply line 244, with no first fluid 216 being directed through the first heat exchanger core 206. Further, when air temperatures are moderately low and/or moisture levels are moderate, only a relatively small amount of the first fluid 216 may be directed into the first heat exchanger core 206 to be used as a melt-pass.

However, in a different scenario, where ice has formed (at least in parts of the heat exchange system 200), temporary high flow of the first fluid 216 through the first heat exchanger core 206 (as a high rate melt-pass) can be used for defrosting the heat exchange system 200. Such temporary diversion of a high volume of the first fluid 216, at a system level, may be less wasteful than alternative methods, such as hot air injection.

As noted above, the sensor 252 (or collection or array of sensors) are configured to measure, at least, metal temperatures (or a proxy thereof) inside the heat exchange system. The measured temperature may be used by the controller 250 employing a control law to determine an appropriate split ratio of the first fluid at the valve 248. Accordingly, the controller 250 may be a computer or computing device arranged to receive detected temperatures and control the valve 248 based on logic and/or preset conditions, values, or criteria. As will be appreciated by those of skill in the art, the temperature reference is strongly operating point dependent, as flows and moisture levels change during system operation. Accordingly, the controller 250 and the logic thereof, may be configured to initiate a defrost cycle (e.g., higher melt-pass flow), periodically or based on sensed or estimated ice levels.

Advantageously, embodiments provided herein enable potentially significant reductions in heat exchange system size and/or volume (by using a warmer melt-pass liquid than otherwise). Further, advantageously, embodiments provided herein enable an ability to adapt heat exchange system operations to changing operating conditions of an aircraft in an optimal fashion instead of relying on a static design (e.g., optimized for a worst-case (but rare) condition).

Furthermore, advantageously, embodiments provided herein provide for reliable prevention or elimination of ice buildup within heat exchange systems of aircraft. Further, advantageously, embodiments provided herein can be arranged to optimize thermal performance of such systems while potentially significantly shrinking overall volume.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A heat exchange system for an aircraft, the heat exchange system comprising:
    an inlet manifold and an outlet manifold with a direction of flow being upstream at the inlet manifold and downstream at the outlet manifold;
    a first heat exchanger core arranged between the inlet manifold and the outlet manifold and located adjacent the inlet manifold;
    a second heat exchanger core arranged downstream of the first heat exchanger core;
    a third heat exchanger core arranged downstream of the second heat exchanger core and located adjacent the outlet manifold, wherein the third heat exchanger core is fluidly connected to the first heat exchanger core; and
    a control system operably connected to the first heat exchanger core and the third heat exchanger core, wherein the control system is arranged to direct a fluid between the first and third heat exchanger cores, wherein:
    the heat exchange system further comprises a first fluid within the first and third heat exchanger cores and a second fluid within the second heat exchanger core, and
    the first fluid is polyalphaolefin (PAO) and the second fluid is aircraft fuel.

2. The heat exchange system according to claim 1, wherein the control system comprises a controller, a valve, a first core supply line, a bypass supply line, and a third core supply line, wherein the first core supply line fluidly connects to the first heat exchanger core and the third core supply line fluidly connects to the third heat exchanger core, and wherein the controller is arranged to control operation of the valve.

3. The heat exchange system according to claim 2, wherein the controller controls operation of the valve based on a detected a temperature within the heat exchange system.

4. The heat exchange system according to claim 2, wherein the controller is arranged to control a fluid flow through the first core supply line, the bypass supply line, and the third core supply line to supply a fluid into the first heat exchanger core and the third heat exchanger core.

5. The heat exchange system according to claim 1, wherein the first heat exchanger core comprises a first passage and a second passage, wherein the first passage is upstream of the second passage.

6. The heat exchange system according to claim 1, wherein the second heat exchanger core comprises a first passage and a second passage, wherein the first passage is downstream of the second passage.

7. The heat exchange system according to claim 1, wherein the third heat exchanger core comprises a first passage located adjacent the outlet manifold and a second passage located upstream from the first passage.

8. The heat exchange system according to claim 1, further comprising a cooling fluid flow from the inlet manifold to the outlet manifold, wherein the cooling fluid extracts heat from the first fluid and the second fluid.

9. An aircraft, comprising:
    a heat exchange system comprising:
        an inlet manifold and an outlet manifold with a direction of flow being upstream at the inlet manifold and downstream at the outlet manifold;
        a first heat exchanger core arranged between the inlet manifold and the outlet manifold and located adjacent the inlet manifold;
        a second heat exchanger core arranged downstream of the first heat exchanger core;
        a third heat exchanger core arranged downstream of the second heat exchanger core and located adjacent the outlet manifold, wherein the third heat exchanger core is fluidly connected to the first heat exchanger core; and
        a control system operably connected to the first heat exchanger core and the third heat exchanger core, wherein the control system is arranged to direct a fluid between the first and third heat exchanger cores, wherein:
        the aircraft further comprises a first fluid within the first and third heat exchanger cores and a second fluid within the second heat exchanger core, and
        the first fluid is polyalphaolefin (PAO) and the second fluid is aircraft fuel.

10. The aircraft according to claim 9, wherein the control system comprises a controller, a valve, a first core supply line, a bypass supply line, and a third core supply line, wherein the first core supply line fluidly connects to the first heat exchanger core and the third core supply line fluidly connects to the third heat exchanger core, and wherein the controller is in communication with the sensor and arranged to control operation of the valve.

11. The aircraft according to claim 10, wherein the controller controls operation of the valve based on a detected temperature within the heat exchange system.

12. The aircraft according to claim 10, wherein the controller is arranged to control a fluid flow through the first core supply line, the bypass supply line, and the third core supply line to supply a fluid into the first heat exchanger core and the third heat exchanger core.

13. The aircraft according to claim 9, wherein the first heat exchanger core comprises a first passage and a second passage, wherein the first passage is upstream of the second passage.

14. The aircraft according to claim 9, wherein the second heat exchanger core comprises a first passage and a second passage, wherein the first passage is downstream of the second passage.

15. The aircraft according to claim 9, wherein the third heat exchanger core comprises a first passage located adjacent the outlet manifold and a second passage located upstream from the first passage.

16. The aircraft according to claim 9, further comprising a cooling fluid flow from the inlet manifold to the outlet manifold, wherein the cooling fluid extracts heat from the first fluid and the second fluid, wherein the cooling fluid is extracted from a turbine of the aircraft.

\* \* \* \* \*